(12) United States Patent
Johnson (10) Patent No.: US 9,333,892 B2
(45) Date of Patent: May 10, 2016

(54) GRAIN CART WITH MOVABLE CONVEYOR SYSTEM

(71) Applicant: Sidney Johnson, Madison, MN (US)

(72) Inventor: Sidney Johnson, Madison, MN (US)

(*) Notice: Subject to any disclaimer, the term of this patent is extended or adjusted under 35 U.S.C. 154(b) by 115 days.

(21) Appl. No.: 14/082,703

(22) Filed: Nov. 18, 2013

(65) Prior Publication Data

US 2014/0178163 A1 Jun. 26, 2014

Related U.S. Application Data

(60) Provisional application No. 61/745,968, filed on Dec. 26, 2012.

(51) Int. Cl.
*B60P 1/42* (2006.01)
*B60P 1/36* (2006.01)

(52) U.S. Cl.
CPC ... *B60P 1/42* (2013.01); *B60P 1/36* (2013.01); *Y10T 29/49826* (2015.01)

(58) Field of Classification Search
CPC ............... B60P 1/40; B60P 1/42; B60P 1/36
USPC .......................................................... 414/523
See application file for complete search history.

(56) References Cited

U.S. PATENT DOCUMENTS

| | | |
|---|---|---|
| 1,663,826 A | 12/1925 | Bernert |
| 1,892,495 A | 12/1932 | Vorthmann |
| 2,354,990 A | 8/1944 | Gilbert et al. |
| 2,401,465 A | 6/1946 | Cwicig |
| 2,431,000 A | 11/1947 | Step |
| 2,517,300 A | 8/1950 | Giese |
| 2,570,630 A | 10/1951 | Domitrovic |
| 2,792,952 A | 5/1957 | Elder |
| 3,575,306 A * | 4/1971 | Obermeyer et al. .......... 414/523 |
| 4,119,223 A * | 10/1978 | Fiechter ........................ 414/523 |
| 4,613,275 A * | 9/1986 | Karlowsky .................... 414/489 |
| 5,484,249 A * | 1/1996 | Klatt ............................. 414/523 |
| 5,520,495 A * | 5/1996 | Sukup .......................... 414/523 |
| 5,538,388 A * | 7/1996 | Bergkamp et al. ............ 414/523 |
| 5,718,556 A * | 2/1998 | Forsyth ........................ 414/503 |
| 5,785,481 A * | 7/1998 | Ockels ......................... 414/523 |
| 6,120,233 A * | 9/2000 | Adam ........................... 414/502 |
| 6,209,880 B1 * | 4/2001 | Turnwald et al. ............. 277/402 |
| 6,497,546 B2 * | 12/2002 | Wood et al. ................... 414/523 |
| 6,910,845 B2 | 6/2005 | Dillon |
| 7,223,059 B2 | 5/2007 | Smith et al. |
| 7,267,519 B2 | 9/2007 | Cresswell et al. |
| 7,488,149 B2 | 2/2009 | Waldner |
| 7,500,814 B2 | 3/2009 | Meyer |
| 7,540,700 B2 | 6/2009 | Hook |
| 8,221,047 B2 | 7/2012 | Petersen et al. |
| 2003/0175103 A1 | 9/2003 | Hunt |
| 2010/0193411 A1 | 8/2010 | Redekop et al. |
| 2012/0096824 A1 | 4/2012 | Burger |
| 2012/0243967 A1 * | 9/2012 | Waldner ........................ 414/523 |

* cited by examiner

*Primary Examiner* — Kaitlin Joerger
(74) *Attorney, Agent, or Firm* — Boyle Fredrickson, S.C.

(57) ABSTRACT

A granular commodity wagon or grain cart assembly that includes a movable conveyor assembly supported by the grain cart. The conveyor assembly is movable between a stowed position and an in-use position. When in the stowed position, the conveyor assembly facilitates a compact footprint of the grain cart assembly for storage and/or transportation. When in the in-use position, the conveyor assembly can be oriented in generally longitudinal alignment with the longitudinal axis associated with the direction of travel of the grain cart assembly to facilitate loading of the cart with a commodity, such as grain, seeds, or beans collected by a harvester or other secondary harvest or collection and/or transport and/or storage vehicle or container.

21 Claims, 9 Drawing Sheets

GRAIN CART WITH MOVABLE CONVEYOR SYSTEM

CROSS REFERENCE TO RELATED PATENT APPLICATIONS

This application is a non-provisional patent application and claims priority to U.S. Provisional Patent Application Ser. No. 61/745,968 filed on Dec. 26, 2012 titled "Grain Cart With Movable Conveyor System" and the disclosure of which is expressly incorporated herein.

BACKGROUND AND SUMMARY OF THE INVENTION

1. Technical Field

The present invention relates generally to agricultural implements associated with crop, seed, or granular commodity collection and transportation such as commodity wagons, gravity boxes, and/or grain wagons and/or carts.

2. Background Art

Commonly, devices such as harvesters or combines collect granular products such as seeds, beans, corn, etc., from fields when such products are ready for harvest. Such machines can be configured to separate the commodity intended to be collected from the remainder of the plant material associated with generating the commodity. Such machines also commonly have limited on-board storage associated with collection or harvest of the pertinent commodity. To improve harvest efficiency, such machines commonly cooperate with ancillary vehicles, such as commodity wagons, grain wagons, or grain carts that are configured to receive the harvested commodity without unduly interfering with harvest operation and/or continued operation of the harvester. Grain carts are also commonly configured to facilitate transport of the commodity to storage or use destinations. The use or storage locations are frequently remote from the fields associated with the harvest operation.

Such transport vehicles are commonly configured for both on and off-road operations and can be configured to cooperate with the harvester during concurrent or intermittent suspension operation of the harvester. That is, some such vehicles require suspension of the harvest operation to effectuate the transfer of the commodity from the harvester to the transport vehicle whereas other transport vehicles will tolerate continued operation of the harvester but periodically only at somewhat slower harvest operation speeds during the commodity transfer activities. Additionally, many transport vehicle, whether utilized during or upon suspension of the harvest operation, require a generally parallel association of the transport vehicle relative to the harvester. Such an orientation of the transport vehicle relative to the harvester commonly requires that at least two passes of the harvester be completed prior to association of the transport vehicle relative to the harvester for the transfer operation to mitigate damage to adjacent un-harvested crops.

Commonly, even two adjacent passes of the harvester clears a crop area that allows only limited manipulation of the commodity wagon and its associated tow vehicle. That is, the crop area cleared by even two adjacent passes of the harvester is frequently insufficient to clear an area of crop sufficient to tolerate turning around of the transport vehicle without considerable manipulation of the transport or tow vehicle and the grain cart without travelling into areas of the field associated with unharvested crop. The movement of the transport vehicle and associated tow vehicle through unharvested areas of a field can detrimentally affect crop yield rates via damage to unharvested standing crops and the inability of the harvester to adequately collect the granular commodity for the damaged crop areas.

Therefore, there is a need for a commodity transport vehicle, grain cart, or wagon that is configured to improve efficient utilization of a harvester, efficient, and judicious communication of the harvested commodity between the harvester and the transport vehicle, provides a variable footprint association of the commodity transport vehicle relative to the harvester, allows versatile positional association of the grain cart relative to a harvester, and facilitates convenient transport of the grain cart, and commodity transported therein, between locations associated with harvesting the commodity and the remote storage or use of the harvest.

SUMMARY

The present invention discloses a grain cart assembly that overcomes one or more of the drawbacks disclosed above. One aspect of the invention discloses a granular commodity wagon or grain cart assembly that includes a movable conveyor assembly that is supported by the grain cart. The conveyor assembly is movable between a stowed position and an in-use position. When in the stowed position, the conveyor assembly facilitates a compact footprint of the grain cart assembly for storage and/or transportation. When in the in-use position, the conveyor assembly can be oriented in generally longitudinal alignment with a longitudinal axis associated with a direction of travel of the grain cart assembly to facilitate loading of the cart with a commodity, such as grain, seeds, or beans collected by a harvester or other secondary harvest or collection and/or transport and/or storage vehicle or container. Such a configuration provides a reduced lateral footprint associated with use of the grain cart assembly. Preferably, the grain cart is configured to be pulled by either a supplemental vehicle or a harvest vehicle and the position of the conveyor can be manipulated by either vehicle to improve the efficiency of harvest operations.

Another aspect of the present invention that is useable with one or more of the above features or aspects discloses a gram cart assembly having a container having a top that is shaped to receive a granular commodity. The container includes a discharge opening associated with removing a granular commodity from the container. A space frame secures a conveyor that extends in an axial direction to the container. The space frame includes a first portion that extends in the axial direction and supports the conveyor and a second portion that extends in a transverse direction relative to the first portion. A pivot is engaged with the second portion of the space frame and the container and defines a pivot axis that is laterally inboard of an outer longitudinal edge of the container. The space frame cooperates with the container to rotate about the pivot axis to be moveable from a stored position that is along a longitudinal side of the container and an in-use position. When in the in-use position, the conveyor is oriented such that a portion of the conveyor overhangs a forward edge of the container, the axial direction of the conveyor is generally aligned with a travel direction of the container, and the conveyor is within a lateral footprint that is normal to a longitudinal axis of the container. Such a construction allows the grain cart assembly to be loaded at locations substantially behind a harvester or within a travel path of the harvester and to achieve a compact configuration when in transit or during non-loading use of the grain cart assembly.

A further aspect of the invention that includes one or more features that are useable in combination with the one or more of the above aspects or features discloses a granular agricultural commodity transport vehicle that includes a hopper having a plurality of upstanding walls that define a volume for containing an agricultural commodity and an opening at an upper end thereof. At least one vehicle frame member is attached to the hopper and at least one running gear is attached to the at least one vehicle frame member such that the commodity transport vehicle is independently transportable. The commodity transport vehicle includes a conveyor that is defined by a longitudinal axis. A conveyor support is attached to the conveyor and is pivotably attached to the at least one vehicle frame member to move the conveyor between a stowed position wherein the conveyor is oriented in close proximity to the hopper and aligned with a longitudinal axis thereof and an in-use position wherein a load end of the conveyor is offset from the hopper and an unload end of the conveyor is positioned proximate the opening defined by the hopper. At least one actuator is attached between the at least one vehicle frame member and the conveyor support and is operable to selectively move the conveyor between the stowed position and the in-use position. Such a construction provides for a compact form factor of the commodity transport vehicle when not used for loading operations.

In a preferred embodiment, a conveyor support is attached to the conveyor and pivotably attached to at least one vehicle or running gear frame member to move the conveyor between a stowed position wherein the conveyor is oriented in close proximity to the hopper and aligned with a longitudinal axis thereof and an in-use position wherein an intake end of the conveyor is offset from the hopper and a discharge end of the conveyor is positioned proximate the opening defined by the hopper. When in the in-use position, the conveyor preferable extends forward from the grain cart such that the grain cart can be aligned generally behind the harvester during the harvest operation. Such a configuration reduces the lateral footprint associated with operation of the harvester and the associated grain cart. In a more preferred aspect, the grain cart can be positioned rearward within a lateral footprint of the harvest vehicle when the conveyor is associated with a discharge chute associated with transferring the granular commodity from the harvester to the grain cart.

Aspects and applications of the disclosure presented here are described further below in the drawings and detailed description. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those of ordinary skill in the art from the following detailed description, drawings, and claims.

BRIEF DESCRIPTION OF THE DRAWINGS

The drawings illustrate a preferred embodiment presently contemplated of carrying out the invention. In the drawings.

In describing the preferred embodiment of the invention that is illustrated in the drawings, specific terminology will be resorted to for the sake of clarity. However, it is not intended that the invention be limited to the specific terms so selected and it is to be understood that each specific term includes all, technical equivalents that operate in a similar manner to accomplish a similar purpose. For example, the word "connected," "attached," or terms similar thereto are often used. They are not limited to direct connection but include connection through other elements where such connection is recognized as being equivalent by those skilled in the art.

DESCRIPTION

This disclosure, its aspects and implementations, are not limited to the specific components or assembly procedures disclosed herein. Many additional components and assembly procedures known in the art consistent with the intended operation and assembly procedures for a commodity transport vehicle such as a grain cart assembly will become apparent for use with implementations of a grain wagon or cart assembly disclosed herein. Accordingly, for example, although particular components are disclosed, such components and other implementing components may comprise any shape, size, style, type, model, version, measurement, concentration, material, quantity, and/or the like as is known in the art for such implementing components, consistent with the intended construction and operation of the disclosed grain cart assembly.

Figure 1:
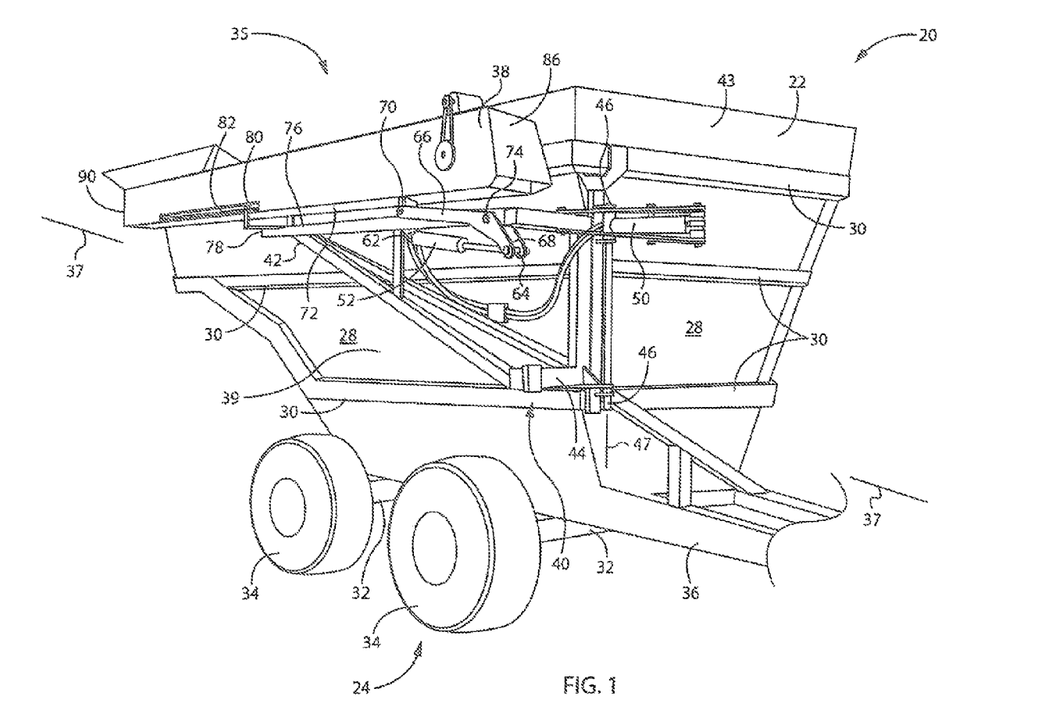
FIG. 1 is a forward and lateral side perspective view of a gram cart assembly according to the present invention with a moveable conveyor in a first or stowed orientation relative to a container of the cart assembly.
Figure 2:
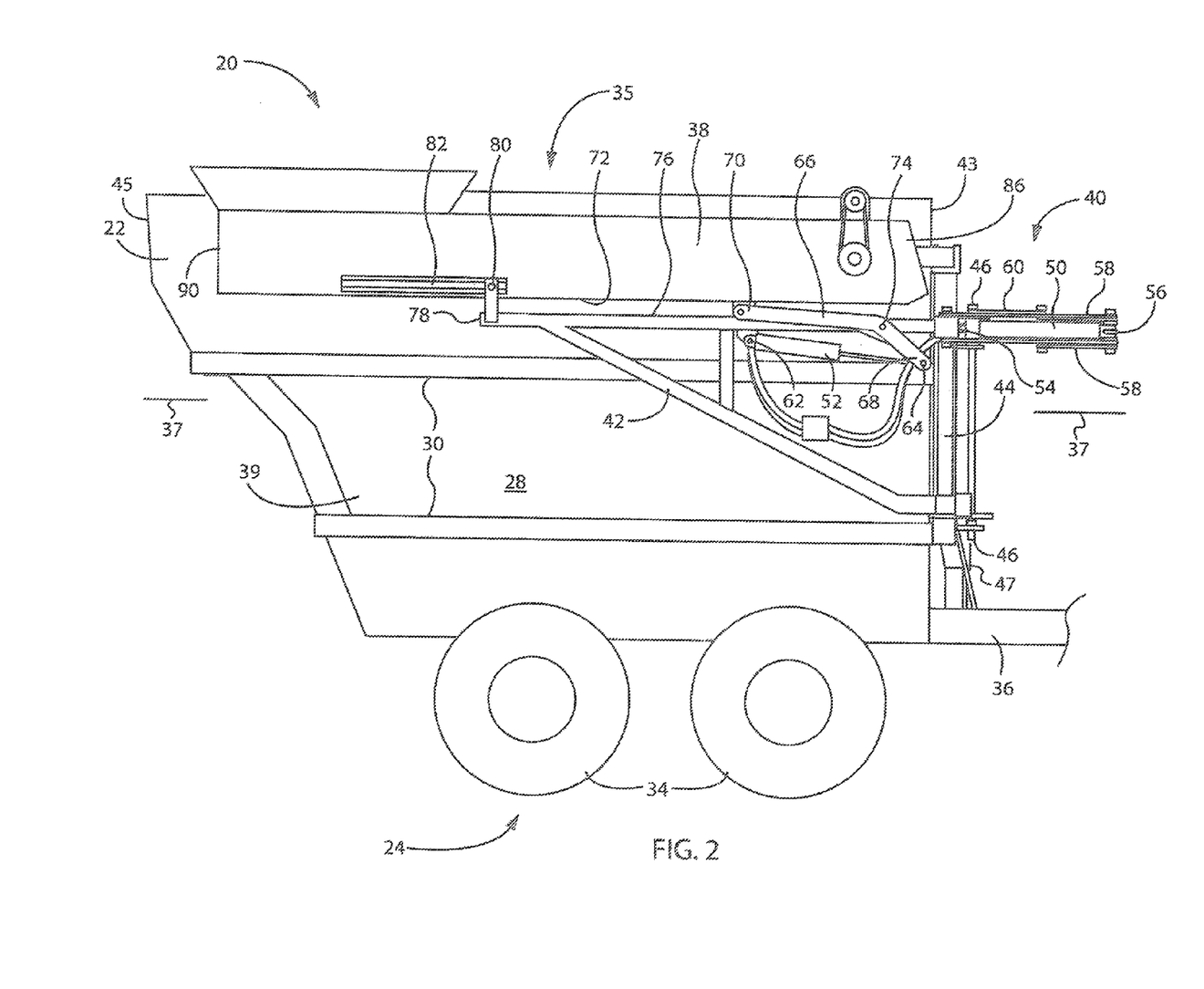
FIG. 2 is a side elevation view of the grain cart assembly shown in FIG. 1.
Figure 3:
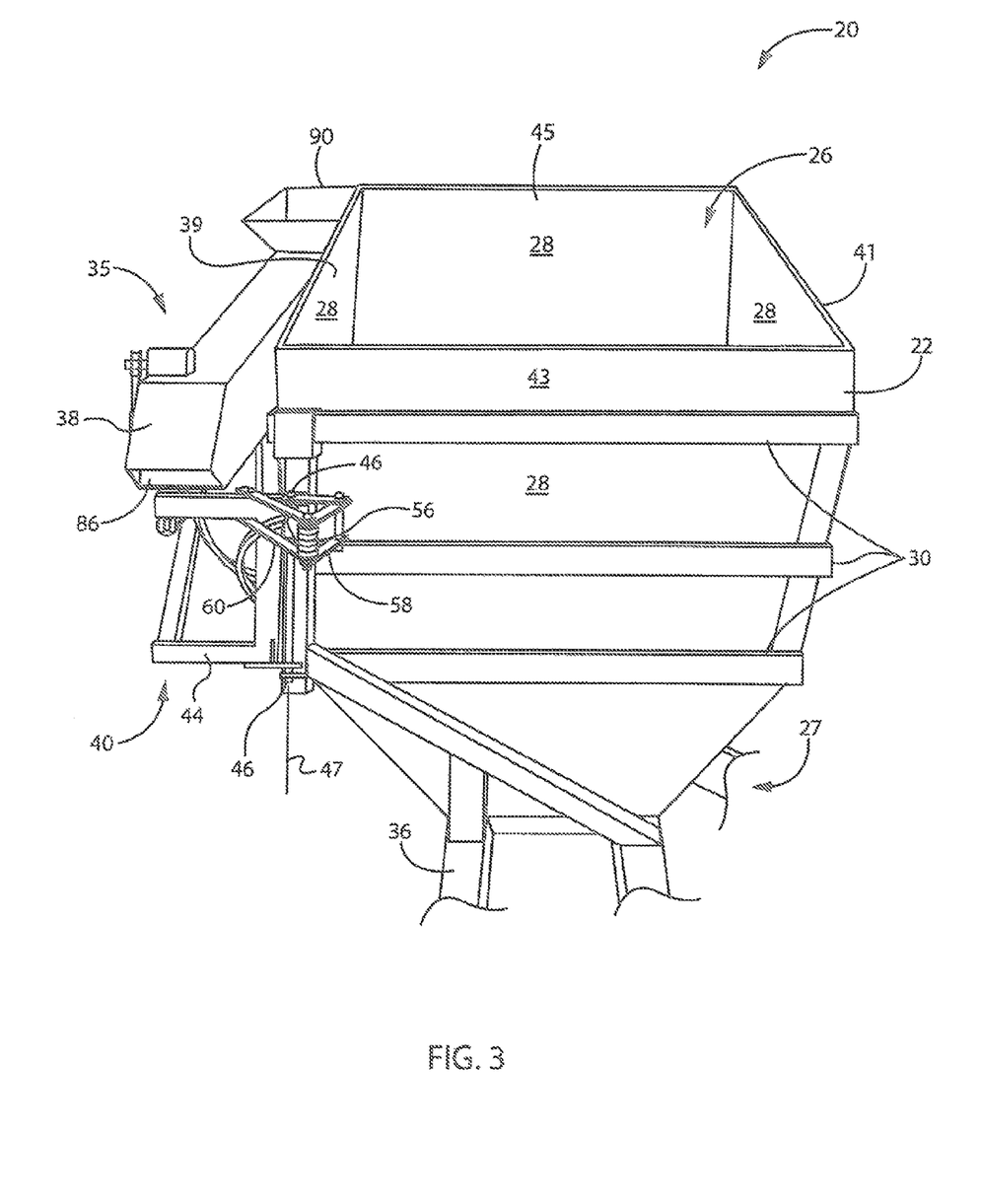
FIG. 3 is a partial front elevation view of a conveyor side of the grain cart assembly shown in FIG. 1.

FIGS. 1-3 show various front and side views of a granular agricultural commodity transport vehicle, grain wagon or cart, or grain cart assembly 20 according to the present invention. Grain cart assembly 20 includes a hopper or container 22 that includes or is configured to cooperate with a running gear assembly 24 associated with facilitating movement of grain cart assembly 20. Although running gear assembly 24 is shown as an assembly commonly understood to facilitate both on and off-road or field transportation of grain cart assembly 20, running gear assembly 24 could be provided in any number of configurations suitable to the intended use or operating conditions associated with use of grain cart assembly 20. It is further appreciated that running gear assembly 24 could be provided in either of a wheeled configuration as shown or be provided in a tracked configuration as is commonly understood.

Container 22 includes a generally open top opening 26 associated with placement of a granular commodity, such as for example grain, seeds, or beans, within container 22. It is appreciated that opening 26 can be generally defined by the upward facing end of container 22 or that container 22 include a fixed or movable cover constructed to reduce the size of opening 26 that is exposed to atmosphere. Preferably, opening 26, and any cover associated therewith, is configured to allow selective communication of a granular commodity into the volume of container 22 via a conveyor whose discharge end is associated therewith as disclosed, further below.

Container 22 preferably includes a discharge opening 27 (FIG. 3) that is generally below top opening 26. The commodity discharge opening 27 can be configured in either of a side or a bottom portion of container 22. Regardless of the location of discharge opening 27 relative to container 22, such an opening is commonly associated with removing or discharging the contents of container 22 into supplemental storage or packaging facilities, or onto supplemental conveyors disposed between the grain cart assembly and a respective storage or packaging facility, whereas grain cart assembly 20 is associated with transporting such commodities from a harvest location to such destinations or other destinations remote from the field associated with the harvest activity. Commonly, regardless of the specific location associated with discharge opening 27 relative to container 22, the granular commodity gravitationally discharges from container 22 although it is envisioned that discharge opening 27 could be configured to cooperate with supplemental conveyors as described above.

As commonly understood, container 22 includes a number of generally planar sidewalls 28, one or more structural or vehicle frame members 30 associated with supporting or reinforcing the various sidewalk 28, as well as any supplemental structures or components associated with the operation and/or use of grain cart assembly 20. Running gear 24 includes one or more structural or vehicle frame members 32 that support one or more wheels 34 or other traction supporting devices, such as tracks, associated with facilitating transportation of grain cart assembly 20 relative to the underlying ground surface—be it paved or unpaved. It is appreciated that grain cart assembly 26 and running gear assembly 24 can be configured for one or both of on and off road transportation and/or operation. Frame members 30 and/or running gear assembly 24 further include a tongue 36 that extends in a forward direction relative to container 22 to facilitate connection of grain cart assembly 22 to a tow 31 (FIG. 8) and/or harvest vehicle 114 (FIG. 8) as further described below. It is appreciated that the shape of container 22 and the configuration and association of running gear 24 associated therewith is merely exemplary of one grain cart assembly 20 according to the present invention.

Commonly, container 22 is provided in a very generally rectangular horizontal cross-sectional shape such that grain cart assembly 20 defines a longitudinal axis, indicated by line 37, that is generally aligned with tongue 36 and which defines a general forward and rearward linear direction of travel of grain cart assembly 20. Understandably, one or more of the axles associated with running gear assembly 24 can be turnable to effectuate the desired steering of grain cart assembly 20 when the grain cart assembly 20 is associated with a tow vehicle. When provided in a tracked configuration, it is appreciated that the rate of operation of the oppositely oriented lateral tracks could be driven at different speeds or operational directions to effectuate a desired turning activity. Wheeled configurations could also be provided in a similar operational configuration to effectuate desired turning operations of grain cart assembly 20 during transport.

Opposite lateral facing sides 39, 41 of container 22 define generally opposite lateral sides of grain cart assembly 20 whereas side 43 is associated with a forward facing side of container 22 and side 45 is associated with a rearward facing side of container 22 as determined by the primary direction of travel of grain cart assembly 20 wherein the forward direction of travel is associated with tongue 36. Many grain cart assemblies commonly include lateral facing sides 39, 41 that are longer than the forward facing side 43 or the rearward facing side 45 of the grain cart assembly such that the longitudinal axis 37 of grain cart assembly 20, and sides 39, 41 of container 22, are generally aligned with the primarily forward and rearward directions of travel of the grain cart assembly.

Figure 8:
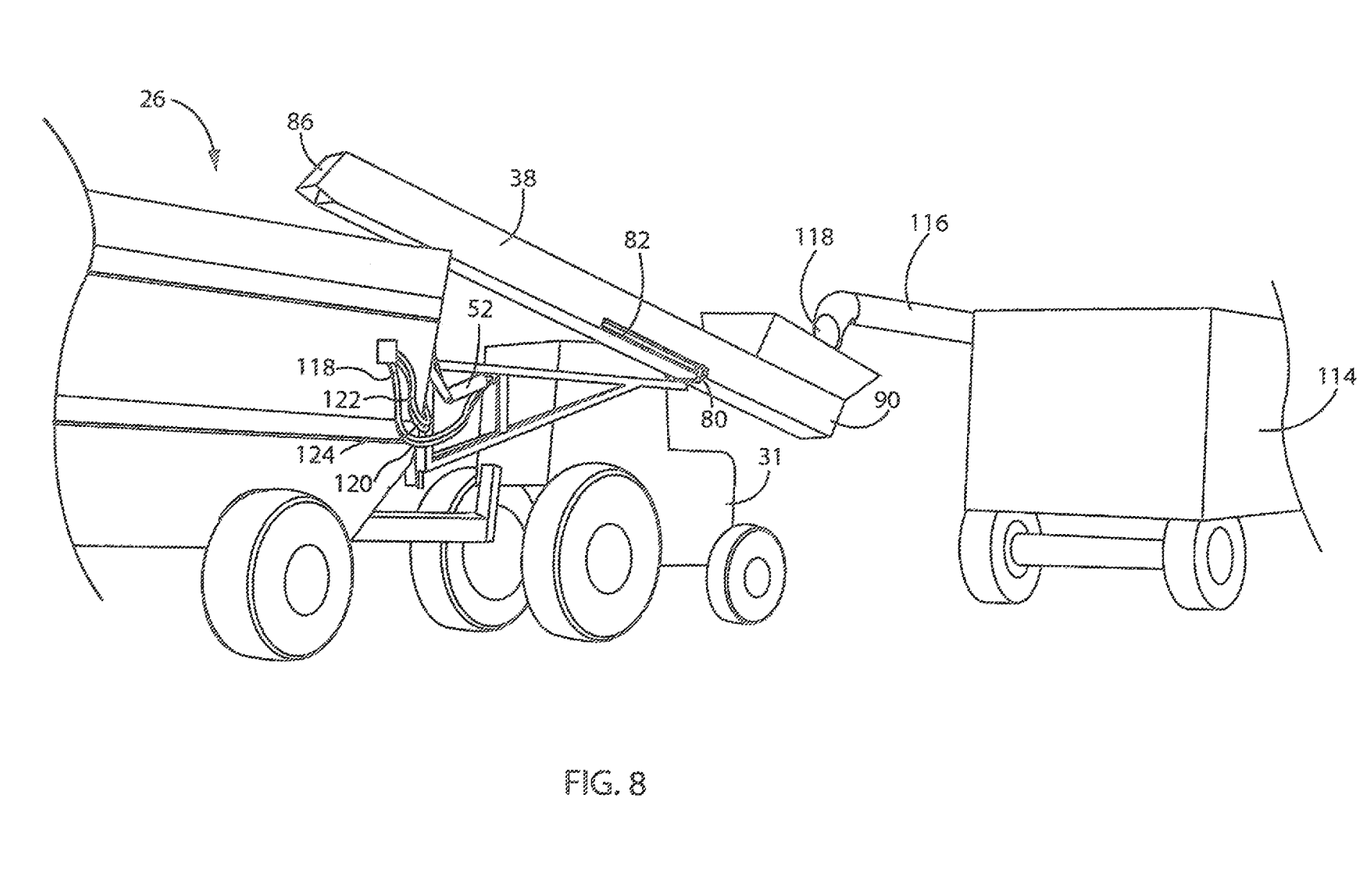
FIG. 8 is a view similar to FIG. 7 and shows the conveyor of the grain cart assembly extending past an optional tow vehicle and generally aligned with a discharge of a harvest vehicle.
Figure 9:
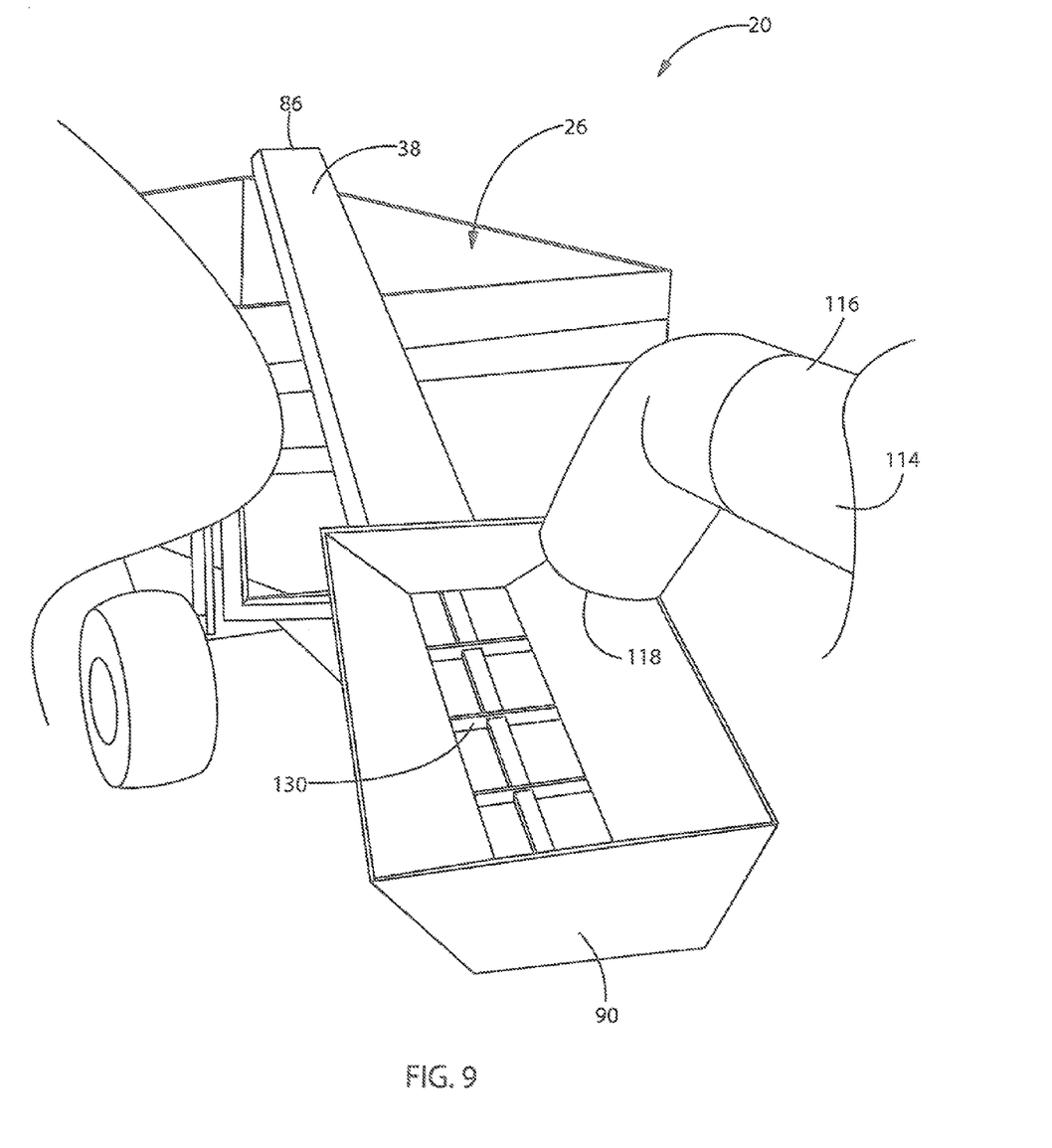
FIG. 9 is a forward elevated partial perspective view of the grain cart assembly shown in FIG. 1 with the conveyor extending in a forward direction past an optional tow vehicle and aligned with a commodity discharge associated with a harvest vehicle.

Regardless of the specific shape of container 22, and the orientation of frame members 30, running gear 24, and running gear frame members 34, grain cart assembly 20 includes a conveyor assembly 35 that is preferably supported by grain cart assembly 20 and movable relative to container 22. It is envisioned that conveyor assembly 35 can have various constructions, such as a screw or belt conveyor 38 for example, which are commonly suitable for moving a granular commodity without substantially damaging the commodity. Conveyor assembly 35 of grain cart assembly 20 includes a conveyor support or space frame 40 that is movably attached to grain cart assembly 20. Space frame 40 is movable, and preferably pivotable relative to grain cart assembly 20, such that conveyor 38 is moveable relative to container 22 between a stored, stowed, or transport position, as best shown in FIGS. 1-3, and an in-use or loading position, as shown in FIGS. 8-9. As explained further below, when in the stowed position, conveyor 38 is maintained in close proximity to a longitudinally extending side 39, 41 of container 22 and when in the in-use position, conveyor 38 extends in a generally forward direction from container 22. Conveyor 38 can also be oriented at an incline relative to the longitudinal axis 37 of grain cart assembly 20. Preferably, conveyor 38 can attain in-use positions of between approximately 45 degrees and 0 degrees in a horizontal plane relative to either side of the longitudinal axis of grain cart assembly 20 and whether co-axial with the longitudinal axis or offset to either lateral side thereof. With respect to the inclined orientation, it is envisioned that conveyor 38 can achieve orientations of between 0 and 45 degrees relative to a horizontal plane.

Referring to FIGS. 1-4, space frame 40 of conveyor assembly 35 includes a first portion 42 that extends in a longitudinal direction generally aligned with a longitudinal axis of conveyor 38. A second portion 44 of space frame 40 extends in a transverse or crossing direction relative to first portion 42. Although other angles are envisioned, second portion 44 may extend in a direction that may be generally perpendicular to the longitudinal axis of first portion 42. Second portion 44 of space frame 40 is secured to container 22 via one or more pivot pins 46 that define a pivot axis 47 or axis of rotation of space frame 40 relative to container 22 such that space frame 40, and the conveyor 38 supported thereby, can be moved between the non-use, storage, or stowed position (FIG. 1) and an operating or in-use position (FIGS. 7-8) that includes orientations wherein the conveyor 38 extends generally nearly completely forward of container 22, aside from a portion of conveyor 38 that overlies opening 26 associated with communication of a granular commodity into container 22.

Grain cart assembly 20 includes a first actuator 50 and a second actuator 52 that are configured to manipulate the orientation of space frame 40 relative to container 22 and manipulate the orientation of conveyor 38 relative to space frame 40, respectively. As explained further below, manipulation of the length of actuator 50 facilitates rotation of space frame 40 about pivot axis 47 relative to container 22 and operation of actuator 52 affects the inclination of conveyor 38 relative to space frame 40. It is appreciated that conveyor 38 and actuators 50, 52 can be powered by a power source supported by grain cart assembly 20 and/or be configured to cooperate with the operating systems, such as a power take off or auxiliary hydraulic or electrical systems associated with a tow or transport vehicle. Preferably, actuators 50, 52 are provided as variable length hydraulic rams that are constructed to be operationally connected to the auxiliary hydraulic systems of a tow or transport vehicle. Such a configuration allows the operator of the respective vehicle to conveniently control the orientation and operation of conveyor assembly 35 from the cab or operator area of the respective vehicle.

Regardless of the operating methodology, actuator 50 includes a first end 54 that is secured to the second portion 44 of space frame 40 or frame 30 of container 22. A second end 56 of actuator 50 is connected to one or more links 58, 60 that extend between second end 56 of actuator 50 and second portion 44 of space frame 40. In the configuration shown, lengthening of actuator 50 rotates space frame 40 in a generally forward direction about pivot axis 47 whereas shortening of actuator 50 rotates space frame 40 in an opposite direction relative to container 22. It is appreciated that the association of the length of the actuator 50 relative to the position of the space frame 40 and relative container 22 could be reversed. That is, it is appreciated that actuator 50 could be connected between container 22 and space frame 40 such that shortening of actuator 50 rotates space frame toward the in-use orientation and lengthening of actuator 50 moves space frame 40 toward the stowed position. It is further appreciated that various other arrangements and numbers of links 58, 60 can be provided to facilitate the rotational interaction between space frame 40 and container 22 upon operation of actuator 50. It is further appreciated that other devices, such as electric or hydraulic motors, could be provided to effectuate the desired rotation of space frame 40 relative to container 22 and that operation of such devices could also be controlled or powered by the auxiliary systems available with many if not most tow and/or harvest vehicles.

A first end 62 of actuator 52 is secured to first portion 42 of space frame 40 and a second end 64 of actuator 52 is connected to a rocker arm 66 or other pivotable link that is pivotably connected to first portion 42 of space frame 40. A first end 68 of rocker arm 66 pivotably cooperates with second end 64 of actuator 52 and a second end 70 of rocker arm 66 is pivotably secured to an underside 72 of conveyor 38. A pivot 74 is disposed between first end 68 and second end 70 of rocker arm 66 and secures rocker arm 66 to an upper member 76 of the first portion 42 of space frame 40.

A distal end 78 of upper member 76 of space frame 40 includes a guide 80 that slidably cooperates with a channel 82 formed along a sidewall 84 of conveyor 38. During operation of second actuator 52, a discharge or first end 86 of conveyor 38 moves in an upward and lateral direction, indicated by arrow 88 (FIG. 6), relative to first portion 42 of space frame 40. Such operation also translates second end 90 of conveyor 38 in a lateral direction, indicated by arrow 92 (FIG. 6), and a slightly downward direction, indicated by arrow 94 (FIG. 6), relative to distal end 78 of first portion 42 of space frame 40. Said in another way, lengthening of actuator 52 moves conveyor 38 toward a horizontal position whereas shorting of actuator 52 imparts an incline to conveyor 38 in a direction from second end 90 toward first end 86. It is appreciated that many linkage and actuator configurations could provide similar functionality and that the operation of actuator 52 could be reversed to effectuate lowering of conveyor 38 when actuator 52 shortens and raising conveyor 38 when actuator 52 lengthens. Regardless of the specific operational association, as explained further below, such manipulation allows first end 86 of conveyor 38 to achieve a position generally above opening 26 of container 22 such that a commodity translated and discharged by conveyor 38 can be captured within container 22 when gain cart assembly 22 is in use and grain cart assembly 22 maintains a generally compact vertical, lateral, and longitudinal footprint during transit or storage of the grain cart assembly 22.

FIGS. 1-3 show conveyor 38 in a first or stored orientation relative to container 22. When in the stored orientation, conveyor 38 generally extends along a longitudinal side of container 22 such that a longitudinal axis of conveyor 38 is generally aligned with but offset from a centerline or longitudinal axis 37 associated with the direction of travel of grain cart assembly 20. As shown from a comparison of FIGS. 4 and 6, operation of second actuator 52 effectuates rotation of rocker arm 66 relative to upper member 76 of space frame 40 to manipulate the elevation of first end 86 and second end 90 of conveyor 38 relative to the stored orientation of conveyor 38. It should be appreciated that the relative elevation of first end 86 and second end 90 of conveyor 38 are inversely related. That is, increasing the elevation of first end 86 decreases the elevation of second end 90. Understandably, it is appreciated that the ratio of the relationship of the respective elevations can be manipulated by manipulation of the location of the slidable and/or pivotable association of rocker arm 66 and guide 80/channel 82 relative to conveyor 38. Regardless of the specific connection orientation, it should be appreciated that the orientation of conveyor 38 shown in FIGS. 5 and 6 increases the overall vertical footprint associated with grain cart assembly 20 relative to the vertical footprint associated with the stored orientation of conveyor 38 relative to container 22 as shown in FIGS. 1-3 but operation of second actuator 66 does not alter the lateral dimension associated the forward or rearward facing vertical footprint of grain cart assembly 20 when conveyor 38 is longitudinally aligned with longitudinal axis 37.

Figure 5:
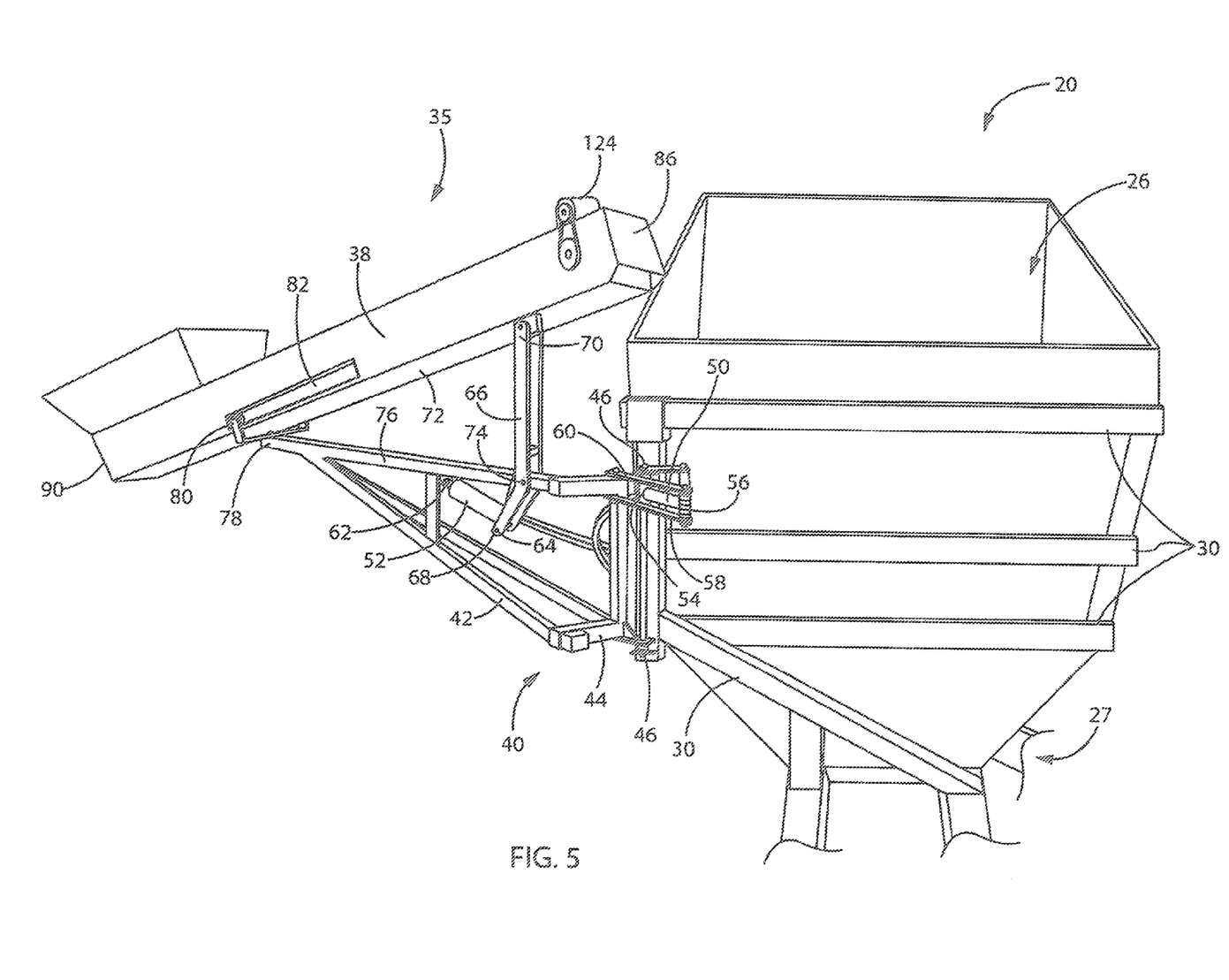
FIG. 5 is a view similar to FIG. 3 with the conveyor assembly oriented in an intermediate horizontal position relative to the container.
Figure 6:
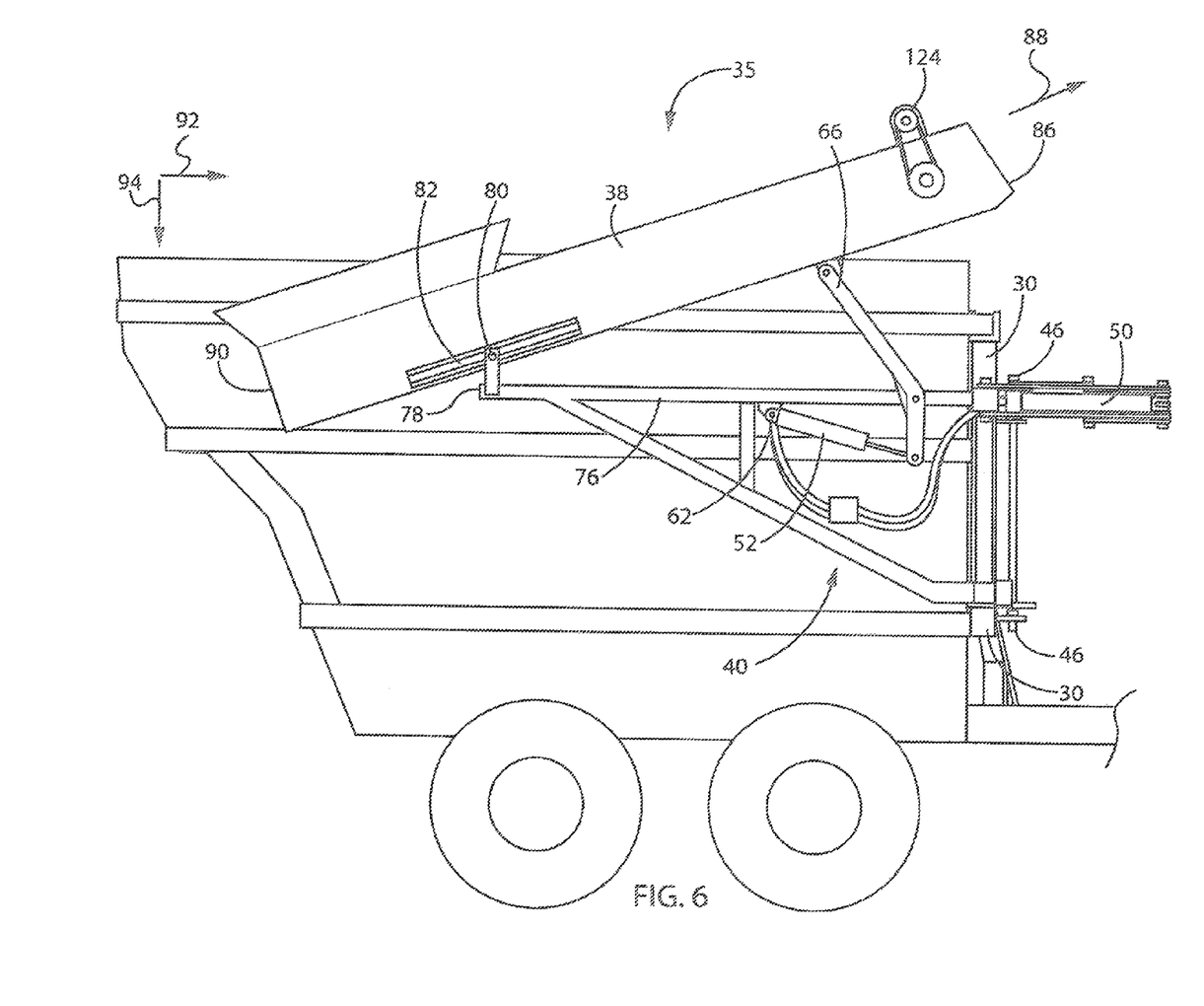
FIG. 6 is a view similar to FIG. 2 with the conveyor oriented in an intermediate inclined position relative to the container of the grain cart assembly shown in FIG. 1.

FIGS. 5 and 6 show various views of space frame 40 and container 22 of grain cart assembly 20 with conveyor assembly 35 inclined and rotated outward from the stowed orientation relative to container 22. Pivot 46 associated with pivot axis 48 is defined by at least one pin 100 that provides an upper pivot mount 102 and a lower pivot mount 104 between frame 30 of container 22 and space frame 40. It is appreciated that there are other various means of providing a mechanically sound pivotable connection between space frame 40 and the underlying structures associated with container 22 and/or container frame members 30. It is further appreciated that one or more rotational support elements, such as bearings or the like, can be provided between the various rotational or pivotable connections between space frame 40 and frame members 30 of grain cart assembly 20. It is further appreciated that one or more supplemental brackets or gussets can be connected, such as via bolts and/or weldments, to one or more of the discrete frame members 30 associated with container 22 to achieve the desired spatial connection between grain cart assembly 20 and space frame 40 and conveyor 38 associated therewith.

FIGS. 5-9 show conveyor assembly 35 and space frame 40 swung in an outward lateral direction relative to lateral side 39 of container 22 and oriented away from the stowed position shown in FIGS. 1-3. Although shown associated with the right hand side of container 22 (when viewed from the rear), it is appreciated that conveyor assembly 35 could also be associated with the opposite lateral side of container 22 should such a configuration be more suitable to a given environment and/or intended operation of grain cart assembly 20. As shown in FIG. 8, tow vehicle 31 removable cooperates with tongue 36 of grain cart assembly 20 and facilitates transportation of the grain cart assembly 20 relative to a harvest vehicle or harvester 114. As shown in FIGS. 8 and 9, harvester 114 includes a discharge chute 116 associated with communicating a granular commodity from harvester 114 to supplemental vehicles such as grain cart assembly 20. Discharge chute 116 is commonly directionally and/or elevationally adjustable and includes a discharge opening 118 configured to provide controlled unloading of the granular commodity from harvester 114. The orientation of conveyor 38 relative to container 22 as shown in FIGS. 8 and 9 represents the largest lateral footprint associated with use of grain cart assembly 20. Inclination of conveyor 38 relative to container 22 reduces the lateral cross-section obscured by portions of grain cart assembly 20 even when conveyor 38 is positioned in the orientation shown in FIGS. 8 and 9 via the upward and toward container 22 translation of conveyor 38 relative to space frame assembly 40.

Figure 4:
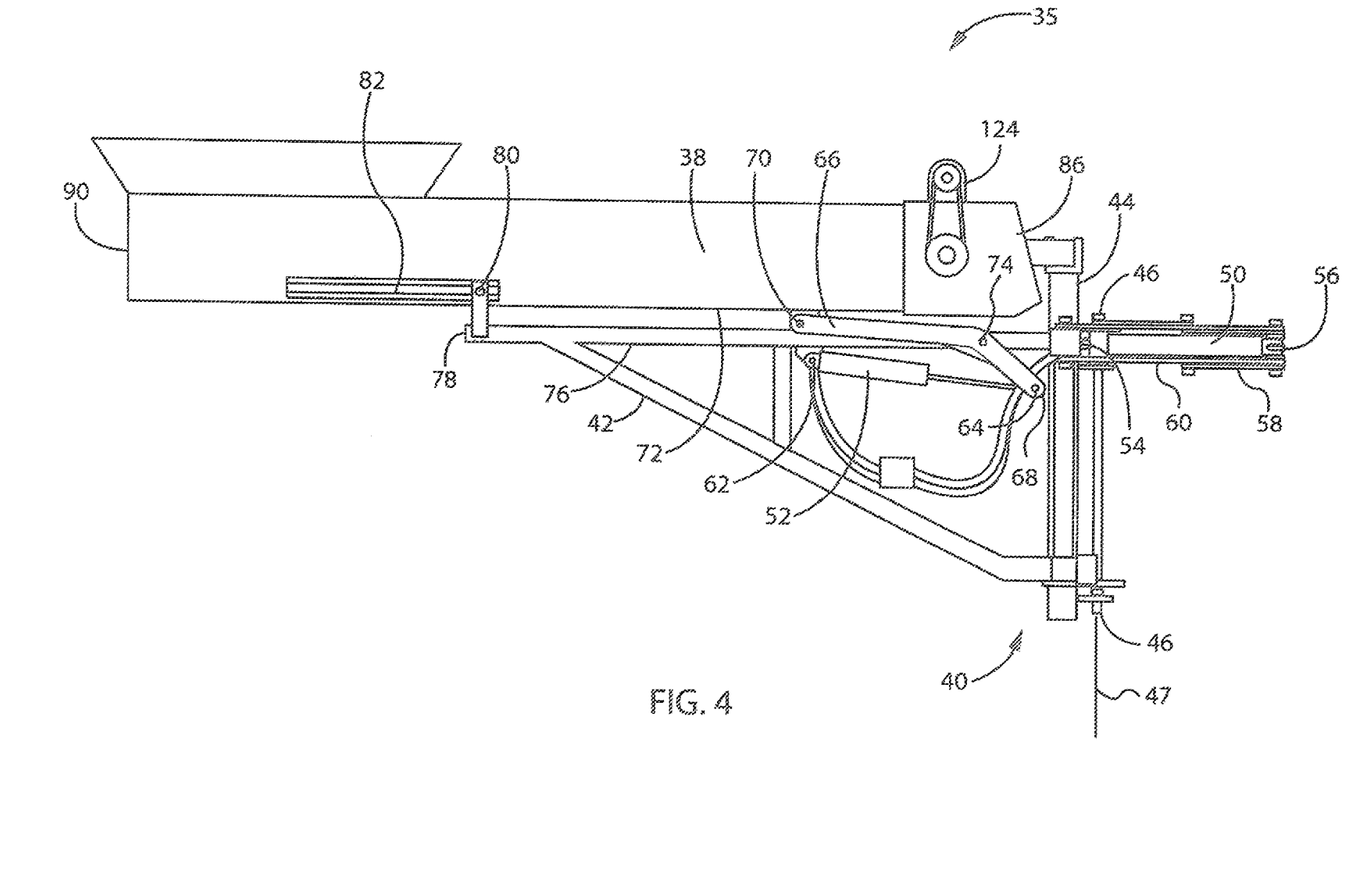
FIG. 4 is a side elevation view of the conveyor assembly removed from the grain cart assembly shown in FIG. 1.
Figure 7:
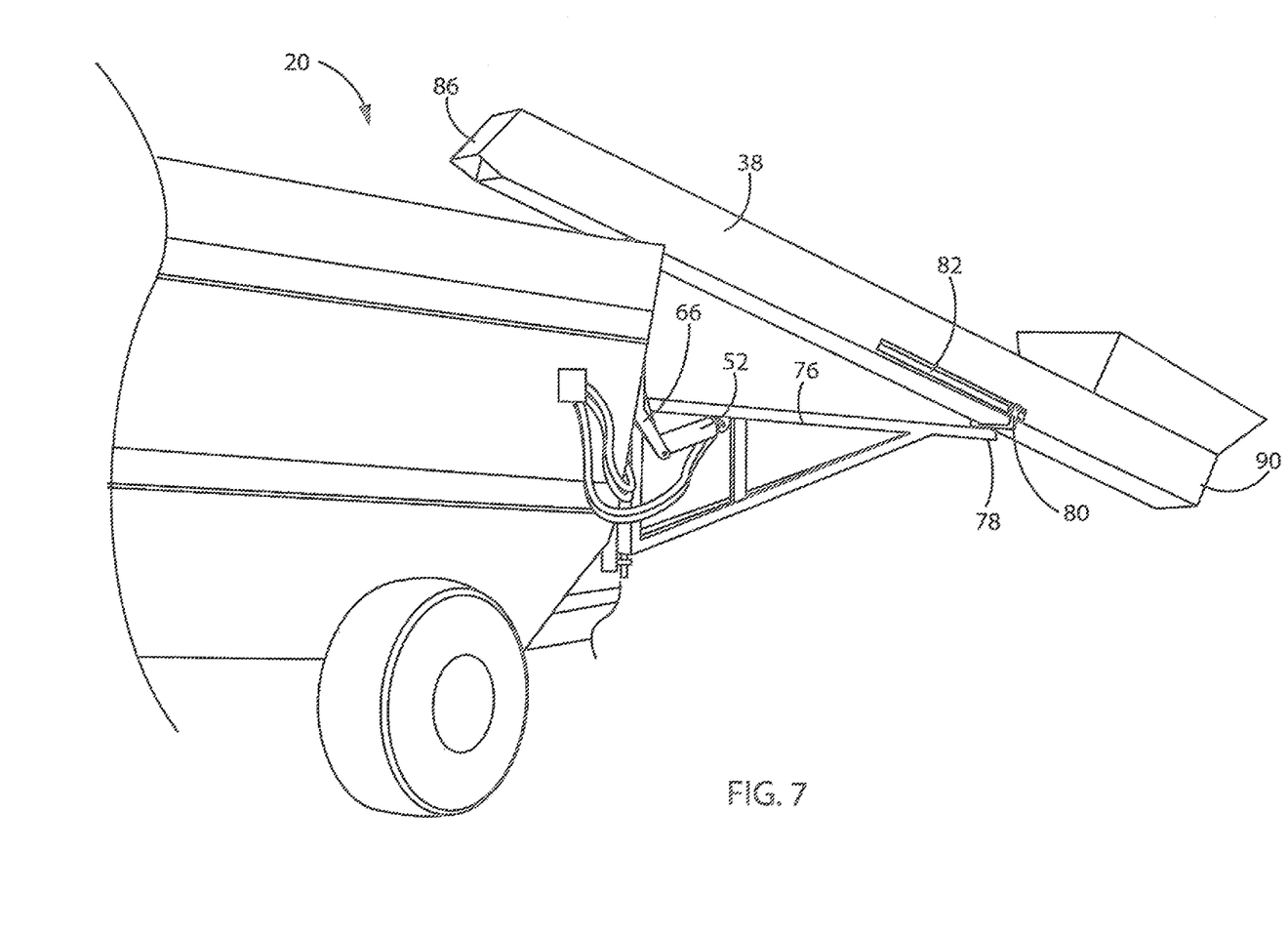
FIG. 7 is a rearward and lateral partial side perspective view of the grain cart assembly shown in FIG. 1 with the conveyor rotated toward a forward extending orientation and inclined in a rearward direction relative to the container.

A plurality of control connections, such as hydraulic lines 116, 118, 120, 122, extend between actuators 50, 52 and are preferably configured to be removably connected to the auxiliary systems of tow vehicle 31 and/or harvester 114 to effectuate movement of conveyor assembly 35 between the stowed orientation, as shown in FIGS. 1-4, and the in-use orientation, as shown in FIGS. 7-9. Referring briefly back to FIG. 4-6, conveyor assembly 35 includes a drive mechanism 124 that effectuates operation of a belt or screw associated with movement of a commodity along the longitudinal length of conveyor 35. Drive mechanism 124 is also preferably configured to removably cooperate with an auxiliary control system of tow vehicle 31 and/or harvester 114. It is further envisioned that operation and control of drive mechanism 124 of conveyor 38 could be integrated with grain cart assembly 20 as such an assembly would allow operation of conveyor 38 from ground locations proximate grain cart assembly 20. It is further appreciated that drive mechanism 124 could be electronically, such as via a motor, or hydraulically driven.

Referring again to FIGS. 8 and 9, FIGS. 8 and 9 show grain cart assembly 20 transported by tow vehicle 31 and positionally associated with granular commodity harvester 114. When intended to convey a commodity from harvester 114 to grain cart assembly 20, conveyor 38 can be rotated further forward from the orientation shown in FIG. 5 such that second end 90 of conveyor 38 is positioned generally forward of container 22 and forward of and/or along a lateral side of tow vehicle 31. When oriented at an incline, first end 86 of conveyor 38 is positioned generally above opening 26 associated with container 22 of grain cart assembly 20. Second end 90 of conveyor 38 can be positioned in close proximity to harvester 114 and in operable proximity to the discharge opening 118 associated with chute 116 so as to receive commodity from harvester 114. Operation of conveyor 38, regardless of its mode of operation associated with translation of the commodity, such as via operation of a screw or a belt 130, translates the commodity delivered from harvester 114 from first end 86 of conveyor 38 toward second end 90 of the conveyor 38 which is disposed above opening 26 of container 22 of grain cart assembly 20, thereby communicating the commodity from the harvester 114 to the grain cart assembly 20 even when the grain cart assembly 20 is positioned directly and nearly entirely behind harvester 114.

As disclosed above, it should be appreciated that operation of first actuator 50, as shown in FIG. 1, effectuates the rotational translation of space frame 40 relative to container 22, and operation of second actuator 52 effectuates manipulation of rocker arm 66 so as to elevate first end 86 of conveyor 38 relative to first portion 42 of space frame 40 and second end 90 of conveyor 38. It is further appreciated that the relative rotational placement of conveyor 38 relative to container 22 can be selected to accommodate the construction of tow vehicle 31 and/or harvester 114. That is, conveyor 38 can achieve an orientation wherein the longitudinal axis of conveyor 38 is contained at least 50% within the footprint associated with the lateral and/or longitudinal footprint of container 22 when conveyor 38 is oriented in the in-use position and when the structure of tow vehicle 31 will tolerate such positioning. It is further appreciated that conveyor assembly 35 can achieve laterally extending orientations wherein the first end 86 of conveyor 38 can be positioned above container 22 and grain cart assembly 20 and tow vehicle 31 are oriented generally alongside harvester 114. That is, use of grain cart assembly 20 and conveyor 38 is possible when conveyor 38 is in various orientations relatives to container 22 and grain cart assembly 20 is in various orientations relative to harvester 114. As mentioned above, it is further appreciated that although grain cart assembly 20 is shown as cooperating with an intermediary tow vehicle 31, it is envisioned that grain cart assembly 20 can also be constructed to cooperate directly with harvester 114 thereby omitting the need for the supplemental tow vehicle 31 aside from the periodic transport of grain cart assemblies between the harvest area and other locations.

It will be understood that implementations are not limited to the specific components disclosed herein, as virtually any components consistent with the intended operation of a method and/or system implementation for a grain cart assembly may be utilized. Components may comprise any shape, size, style, type, model, version, class, grade, measurement, concentration, material, weight, quantity, and/or the like consistent with the intended operation of a method and/or system implementation for a grain cart assembly having a variable position conveyor associated therewith for communicating commodity from a harvester or other location into the grain cart.

The concepts disclosed herein are not limited to the specific implementations shown herein. For example, it is specifically contemplated that the components included in a particular implementation of a grain cart assembly may be formed of any of many different types of materials or combinations that can readily be formed into shaped objects and that are consistent with the intended operation of the disclosed grain cart assembly. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the grain cart assembly may be manufactured separately and then assembled together, or any or all of the components may be manufactured simultaneously and integrally joined with one another. Manufacture of the various components of the grain cart assembly separately or simultaneously may involve various manufacturing methodologies. If any of the components are manufactured separately, they may then be coupled or removably coupled with one another in any manner, such as with adhesives, weldments, severable or removable connectors or fasteners, any combination thereof, and/or the like for example, depending on, among other considerations, the particular material(s) forming the respective components and/or the desired connection therebetween.

In places where the description above refers to particular implementations of a grain cart assembly, it should be readily apparent that a number of modifications may be made without departing from the spirit thereof and that these implementations may be applied to commodity transport vehicles other than grain carts. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

What is claimed is:

1. A grain cart assembly comprising:
   a container having a top that is shaped to receive a granular commodity and a discharge opening associated with removing a granular commodity from the container;
   a conveyor that extends in an axial direction and is defined by an intake end and a discharge end of the conveyor;
   a space frame that secures the conveyor to the container, the space frame comprising:
      a first portion that extends in the axial direction and supports the conveyor such that the conveyor is translatable in the axial direction of the conveyor relative to the space frame;
      a second portion that extends in a transverse direction relative to the first portion;
   a pivot engaged with the second portion of the space frame and the container, the pivot defining a pivot axis that is laterally inboard of an outer longitudinal edge of the container and laterally offset relative to the conveyor, the space frame cooperating with the container to rotate about the pivot axis to be moveable from a stored position along a longitudinal side of the container and an in-use position wherein the discharge end of the conveyor overhangs a forward edge of the container and such that the axial direction of the conveyor is generally aligned with a travel direction of the container and the conveyor is positioned within a lateral footprint that is normal to a longitudinal axis of the container when the conveyor is oriented in an in-use position.

2. The grain cart assembly of claim 1 wherein the conveyor is located nearer the longitudinal axis of the container than the pivot axis when in the in-use position.

3. The grain cart assembly of claim 1 further comprising a first actuator configured to manipulate an orientation of the space frame relative to the container and a second actuator configured to manipulate a pitch of the conveyor relative to the space frame.

4. The grain cart assembly of claim 3 wherein the first actuator and the second actuator are further defined as hydraulic cylinders configured to be fluidly connected to a hydraulic system of a supplemental vehicle.

5. The grain cart assembly of claim 4 wherein the supplemental vehicle is further defined as one of tractor and a harvester.

6. The grain cart assembly of claim 1 wherein the conveyor is translatable relative to the first portion of the space frame in a direction aligned with the axial direction of the conveyor.

7. The grain cart assembly of claim 6 further comprising a rocker arm secured to the first portion of the space frame, the rocker arm having a first portion secured to the conveyor and a second portion engaged with a variable length actuator.

8. The grain cart assembly of claim 1 further comprising a running gear configured for at least one of on road transportation and off road transportation of the container.

9. The grain cart assembly of claim 1 further comprising a first flange and a second flange that extend in a forward direction from a frame of the container, the first and second flanges being configured to cooperate with an end of the second portion of the space frame and the pivot to secure the space frame to the frame of the container.

10. The grain cart assembly of claim 1 wherein the conveyor is telescopic.

11. The grain cart assembly of claim 1 wherein the first portion of the space frame is shorter than the conveyor and the second portion of the space frame extends in a direction normal to the first portion and beyond a horizontal footprint of the conveyor.

12. A granular agricultural commodity transport vehicle comprising:
   a hopper having a plurality of upstanding walls that define a volume for containing an agricultural commodity and an opening at an upper end thereof;
   at least one vehicle frame member attached to the hopper;
   at least one running gear attached to the at least one vehicle frame member;
   a conveyor defined, by a longitudinal axis;
   a conveyor support attached to the conveyor and pivotably attached to the at least one vehicle frame member to move the conveyor between a stowed position wherein the conveyor is substantially horizontally oriented in close proximity to the hopper and aligned with a longitudinal axis thereof and an in-use position wherein a load end of the conveyor is offset from the hopper in a forward facing direction and an unload end of the conveyor is positioned over the opening defined by the hopper and such that a longitudinal axis of the conveyor is generally aligned with the longitudinal axis of the hopper and a travel direction of the vehicle frame; and
   at least one actuator attached between the at least one vehicle frame member and the conveyor support, the at least one actuator being operable to selectively move the conveyor between the stowed position and the in-use position.

13. The granular agricultural commodity transport vehicle of claim 12 further comprising another actuator that is operable to translate the conveyor relative to the conveyor support.

14. The granular agricultural commodity transport vehicle of claim 13 wherein the another actuator is operable to manipulate an incline of the conveyor relative to the conveyor support.

15. The granular agricultural commodity transport vehicle of claim 13 wherein at least one of the at least one actuator and another actuator is further defined as a hydraulic actuator and the hydraulic, actuator is selectively operable by a hydraulic system of a tow vehicle.

16. The granular agricultural commodity transport vehicle of claim 12 wherein the conveyor support is pivotable about a vertically oriented axis that is located between a lateral edge and a longitudinal centerline of the hopper.

17. The granular agricultural commodity transport vehicle of claim 16 wherein the conveyor support includes a lateral portion that is generally aligned with a lateral edge of the hopper when the conveyor is in the stowed position and the in-use position and a longitudinal portion that is longer than the lateral portion and that is generally aligned with the longitudinal axis of the hopper when the conveyor is in the in-use position.

18. A method of forming a grain wagon comprising:
   forming a container having an opening proximate a top end thereof;
   supporting the container with a running gear; and
   attaching a conveyor to the container such that the conveyor is movable relative to the container to move in a rotational direction and an axial direction between a stowed position wherein the conveyor extends in a generally horizontal orientation along a longitudinal side of the container and an in-use position wherein the conveyor extends forward relative to the container such that a length of the conveyor is oriented within lateral edges of a forward facing side of the container, the conveyor is translatable in the axial direction defined by the conveyor such that a discharge end of the conveyor is disposed over the opening of the container, and such that the conveyor is oriented at a greater pitch, within the lateral edges of the forward facing side of the container when in the in-use position, than a pitch of the conveyor associated with the stowed position.

19. The method of claim 18 further comprising attaching a first actuator between the conveyor and the container to swing the conveyor in a horizontal direction between the stowed position and the in-use position.

20. The method of claim 19 further comprising attaching a second actuator between the conveyor and the container to manipulate the pitch of the conveyor relative to the container.

21. The method of claim 20 further comprising configuring at least one of the first actuator and the second actuator to removably cooperate with an actuator operating system of a tow vehicle.

* * * * *